(12) United States Patent
Xie et al.

(10) Patent No.: US 6,563,982 B1
(45) Date of Patent: May 13, 2003

(54) METHOD AND APPARATUS FOR PARALLEL OPTICAL PROCESSING

(75) Inventors: Ping Xie, San Jose, CA (US); Salvador P. Tiscareno, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 251 days.

(21) Appl. No.: 09/659,903

(22) Filed: Sep. 12, 2000

Related U.S. Application Data
(60) Provisional application No. 60/220,209, filed on Jul. 22, 2000.

(51) Int. Cl.[7] ................................................. G02B 6/32
(52) U.S. Cl. ............................................ 385/33; 359/131
(58) Field of Search ............................... 385/33, 54, 74, 385/11, 24; 359/484, 117, 129

(56) References Cited

U.S. PATENT DOCUMENTS

| | | | | |
|---|---|---|---|---|
| 4,213,677 A | * | 7/1980 | Sugimoto et al. | 359/131 |
| 4,472,797 A | * | 9/1984 | Nicia | 359/117 |
| 5,026,131 A | * | 6/1991 | Jannson et al. | 359/130 |
| 5,165,104 A | * | 11/1992 | Weverka | 385/14 |
| 5,796,889 A | | 8/1998 | Xu et al. | 385/33 |
| 5,850,493 A | | 12/1998 | Cheng | 385/34 |
| 5,917,626 A | * | 6/1999 | Lee | 359/124 |
| 5,956,441 A | * | 9/1999 | Fairchild et al. | 359/131 |
| 6,014,256 A | * | 1/2000 | Cheng | 359/494 |
| 6,181,850 B1 | * | 1/2001 | Nakamura et al. | 359/124 |

FOREIGN PATENT DOCUMENTS

| JP | 55046703 A | * | 4/1980 |
|---|---|---|---|
| JP | 58171018 A | * | 10/1983 |

* cited by examiner

Primary Examiner—Lynn D. Feild
Assistant Examiner—Brian S. Webb
(74) Attorney, Agent, or Firm—Fish & Richardson P.C.

(57) ABSTRACT

A method and apparatus for the parallel optical processing of a plurality of optical beams within a single optical processing unit is provided. The optical processing unit may perform any of the functions associated with the following 3 port devices: a circulator, a demultiplexer, an interleaver, a multiplexer, a forward power tap, a reverse power tap, a power splitter, a polarization beam combiner and a polarization beam splitter. Access to the optical processing unit is provided by opposing bundles of optical fibers the input and output of which is directed from and to the optical function unit by lenses. Each triplet of optical fibers provides 3 ports of access to the optical processing unit. This allows multiple discrete optical beams each with unique optical parameters, e.g. wavelength, power, modulation, polarization, propagation direction, etc. to be individually delivered, to the optical processing unit on respective optical fibers, to be processed in parallel within the optical processing unit, and to be output individually on the appropriate ones of the optical fibers associated with each of the triplets.

The performance of a given optical processing unit with respect to any optical beam delivered to it may be improved by coupling the appropriate ports of two or more of the triplets to effectively reintroduce to the optical processing unit via the appropriate port(s) of a second of the triplets at least a portion of a beam initially introduced to the optical processing unit through a selected port(s) of a first of the triplets.

31 Claims, 5 Drawing Sheets

METHOD AND APPARATUS FOR PARALLEL OPTICAL PROCESSING

CROSS-REFERENCE TO RELATED APPLICATION

This application claims priority from Provisional Application No. 60/220,209, entitled "OPTICS FOR MULTI-PORT OPTIC DEVICES" filed on Jul. 22, 2000 which is incorporated herein by reference in its entirety.

BACKGROUND OF THE INVENTION

1. Field of the Invention

This invention generally relates to optical components generally and more particularly to parallel optical processing within a shared optical component.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions of the light spectrum. WDM is therefore the optical equivalent of frequency division multiplexing (FDM). Current implementations of WDM involve as many as 128 semiconductor lasers each lasing at a specific center frequency within the range of 1525–1575 nm. Each subscriber datastream is optically modulated onto the output beam of a corresponding semiconductor laser. The modulated information from each of the semiconductor lasers is combined onto a single optic fiber for transmission. As this digital signal is passed across an optical network, it will be subject at various intervals to amplification by, for example, Erbium doped amplifiers and dispersion compensation by, for example, optical circulators with coupled Bragg filters. At each node in the network, e.g. central office or remote terminal, optical transceivers mounted on fiber line cards are provided. On the transmit side, a framer permits SONET framing, pointer generation and scrambling for transmission of data from a bank of lasers and associated drivers, with each laser radiating at a different wavelength. On the receive side, the incoming signals are separated into channels detected by photodetectors, framed and decoded.

Throughout the network a broad range of passive optical components are utilized to process optical beams from individual optical fibers.

Two port devices condition a single beam of light on a single optical path. An isolator blocks feedback to the source of an optical beam. A modulator uses an electro/magneto optic or other property of a crystal/wave guide to modulate a single beam of light passing through it. A filter blocks a portion of the spectrum of a single beam of light passing through it.

Three port devices handle more complex optical functions such as splitting/routing beams based on optical properties thereof. Three port devices, require precise alignment of two/three beams of light across two optical paths.

Circulators separate optical beams on the basis of the direction of their propagation. Thus a circulator can be used to separate the sender's and receiver's communications initially duplexed on a single optical fiber.

The multiplexers, demultiplexers, and interleavers are used to separate individual or discrete sets of channels of a WDM communication on a single optical fiber.

The power taps and splitters are used to split a single laser source into multiple optical beams at selected relative intensities.

The polarization beam splitters are used to separate arbitrarily polarized light into orthogonally polarized components. The combiners are used to perform the opposite operation.

The components are expensive to manufacture. In addition, one passive optical component is required for each optical fiber. A typical telecom installation at either the central office or relay site handles thousands of optical fibers each with their own associated passive and active components.

What is needed is a way to reduce the cost, complexity, and form factor(s) associated with providing active and passive optical components to optical fibers.

SUMMARY OF THE INVENTION

The present invention advantageously provides a method and apparatus for the parallel optical processing of a plurality of optical beams within a 3 port optical processing unit. The optical processing unit may perform any of the functions associated with the following 3 port devices: a circulator, a multiplexer/demultiplexer, an interleaver, a forward/reverse power tap, a power tap/splitter, a polarization beam combiner/splitter. Access to the optical processing unit is provided by opposing bundles of optical fibers the input and output of which is directed from and to the optical function unit by lenses. Each triplet of optical fibers provides 3 ports of access to the optical processing unit. This allows multiple discrete optical beams each with unique optical parameters, e.g. wavelength, power, modulation, polarization, propagation direction, etc. to be individually delivered, to the optical processing unit on respective optical fibers, to be processed in parallel within the optical processing unit, and to be output individually on the appropriate ones of the optical fibers associated with each of the triplets.

The present invention further advantageously provides optimal and uniform coupling between each triplet of optical fibers, i.e. each discrete set of 3 access ports, with the optical processing unit. This is achieved in part by a precise geometric arrangement of all elements of the apparatus.

The present invention further advantageously provides a reduced form factor and cost when compared with individual 3 port devices.

The present invention also advantageously provides both method and apparatus for improving the performance of a given optical processing unit with respect to any optical beam delivered to it. This improvement results from coupling the appropriate ports of two or more of the triplets to effectively reintroduce to the optical processing unit via the appropriate port(s) of a second of the triplets at least a portion of a beam initially introduced to the optical processing unit through a selected port(s) of a first of the triplets.

In an embodiment of the invention an optical apparatus for parallel optical processing of optical beams on optical fibers is provided. The optical apparatus includes: a first bundle and a second bundle of optical fibers, lenses, and an optical processing unit. Each optical fiber includes a corresponding interface. Across the first and second bundle of optical fibers each triplet of the optical fibers is aligned with a single member of the triplet on one of the bundles and the remaining pair of members in a row on the other of the bundles. The rows formed by the corresponding paired members of each of the triplets align with each other. The lenses direct the optical beams from either of the bundles of optical fibers toward substantially coincident focal points. The optical processing unit processes the optical beams directed by the lenses.

In another embodiment of the invention a method for parallel optical processing of optical beams is disclosed. The method comprising the acts of:

aligning the optical paths substantially parallel with a first axis, with triplets of the optical paths each including a pair of optical paths defining a row and a single optical path and the interfaces of the triplets defining an opposing pair of terminations of the optical paths, with the rows of the triplets substantially parallel to one another;

directing the optical beams from either of the opposing pair of terminations toward substantially coincident focal points between the pair of terminations;

optically processing the optical beams directed in said act of directing.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention provides a method and apparatus for the parallel optical processing of a plurality of optical beams within a single optical processing unit. Access to the optical processing unit is provided by opposing bundles of optical fibers the input and output of which is directed from and to the optical function unit by lenses. Each triplet of optical fibers provides 3 ports of access to the optical processing unit. This allows multiple discrete optical beams each with unique optical parameters, e.g. wavelength, power, modulation, polarization, propagation direction, etc. to be individually delivered, to the optical processing unit on respective optical fibers, to be processed in parallel within the optical processing unit, and to be output individually on the appropriate ones of the optical fibers associated with each of the triplets.

Figure 1A:
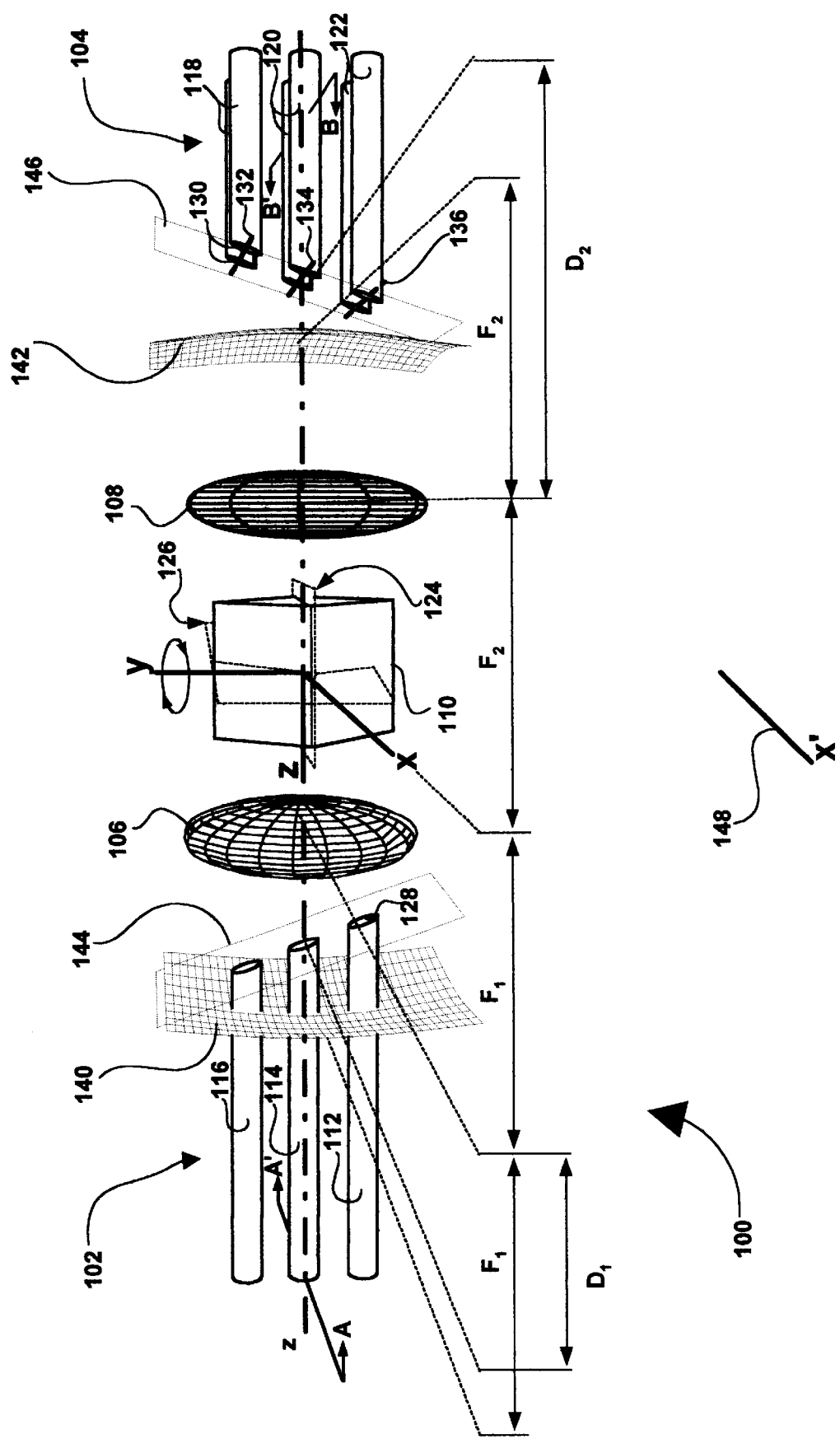
FIG. 1A is a front isometric view of an optical apparatus for parallel optical processing of optical beams on optical fibers which share an optical processing unit in accordance with an embodiment of the invention.

FIG. 1A is a front isometric view of an optical apparatus 100 for parallel optical processing of optical beams on optical fibers which share an optical processing unit in accordance with an embodiment of the invention. The entire apparatus is shown aligned with respect to the three mutually orthogonal axis of an x,y,z Cartesian coordinate system. The optical apparatus includes a first and second bundle 102–104 of optical fibers, lenses 106–108, and an optical processing unit (OPU) 110. The first bundle 102 includes 3 individual optical fibers 112–116. The second bundle includes 3 pairs of optical fibers 118–122.

The layout of each of the components of the system determines the efficiency and uniformity of the optical coupling of the fibers with one another via the lenses and OPU. The optical fibers on each of the bundles are oriented in groups of 3, i.e. triplets, each of which may be utilized to access the optical processing unit independently of the other. One member of each triplet is located on one of the bundles and the remaining pair of members of the triplet are located on the other of the two bundles.

The paired members of each triplet are aligned in rows. In the embodiment shown there are a total of 9 optical fibers which are grouped to form 3 triplets. The paired members of each triplet are located on one of the bundles, e.g. the second bundle 104. The first triplet is formed by the single optical fiber 116 and the pair of optical fibers 122. The second triplet is formed by the single optical fiber 114 and the pair of optical fibers 120. The third triplet is formed by the single optical fiber 112 and the pair of optical fibers 118. The paired members 118,120,122 of each triplet form three rows 132, 134, 136 respectfully. These three rows are mutually parallel to one another and to the plane formed by the x-z axis. The opposing single and paired members of a triplet that are offset from this plane are offset at complementary displacements along the y axis.

Each optical fiber has a beveled end/interface. Interface 128 forms the end of optical fiber 112. This fiber is the single member of the triplet which includes the opposing pair of members 118. The pair of interfaces 130 form the ends of the pair of optical fibers 118. Each of the remaining fibers has its own individual interface. The interfaces of the fibers 112–116 on the first bundle are beveled and staggered to form a substantially planar termination aligned with plane 144. The interfaces of the paired fibers 118–122 on the second bundle are beveled and staggered to form a substantially planar termination aligned with plane 146. These planar terminations are aligned with the z axis at complementary obtuse angles to one another. They are parallel to the x axis, thus projections thereof intersect at line 148 which is parallel to the x axis.

In an embodiment of the invention the angles range from +/−94 degrees to +/−100 degrees. In general the angulation of the substantially planar terminations of the bundles reduces spurious feedback in the apparatus. The angulation at complementary angles has the additional benefit of centering the optical beams passed between individual source and target fibers on the two bundles within the acceptance cones of the respective source and target fibers. The acceptance cone is defined to have a half-angle θmax beyond which angle rays incident to the interface of the fiber will leak out of the optical fiber, thus reducing the coupling efficiency of the unit.

The alignment of the rows formed by the paired members of each triplet also provides improvements in the optical coupling. Optical coupling between the single and paired members of any selected triplet is optimized by aligning the paired members at equal optical pathlengths with respect to the single member. This is accomplished in the embodiment shown by aligning the paired members in rows in which the interfaces themselves are parallel to the x axis and at equal displacements from the z-y plane which intersects the single member of each triplet. Uniformity of coupling between any of the triplets is brought about by the further requirement that each of the triplets exhibits the same optical pathlengths between single and paired members as the others. In the embodiment of the invention shown in FIG. 1A this is accomplished by staggering of the single and paired members of each triplet within their corresponding bundles. This has the additional benefit of allowing the beveling of the interfaces at the ends of each of the fibers to be accomplished by polishing the bundle as a whole rather than the fibers individually.

In the embodiment shown the pair of lenses 106–108 are used to direct optical beams from either of the bundles toward the optical processing unit 110. Geometrically, the optical centers of the lenses 106–108, is located in the plane formed by the x-z axis. Between the lenses, the focal point $F_1$ of lens 106 and $F_2$ for lens 108 are substantially coincident. In an embodiment of the invention lenses 106 and 108 have identical focal points. Outside the lenses the focal planes 140 for lens 106 and 142 for lens 108 are shown. The ends of the fiber bundles are placed at complementary offsets with respect to the focal planes 140–142. Thus termination plane 144 of bundle 102 lies inside focal plane 140 while termination plane 146 of bundle 104 lies outside focal plane 142. This provides a matching of the optical convergence of one bundle lens system with the optical divergence of the other.

The lens system chosen for the optical apparatus will play a major role in determining the coupling efficiency of the device. Several requirements must be met. Aberrations must be minimized. The lens system must offer the same optical performance between optical fibers displaced from the optical axis, i.e. the z axis, as it does for those on the axis. Additionally, the lens system must provide a large working distance between its exterior surfaces and its focal point, to allow for the more complex optical processing units associated with 3 port devices. An aspherical lens meets both the above requirements.

Reducing the effects of the resulting aberrations on coupling losses is critical to the implementation of the subject invention. An aspherical lens minimizes the primary aberrations affecting the parallel optical processing of multiple optical beams. These aberrations are: spherical aberration, coma, and field curvature.

Spherical aberration of a lens arises from the light rays passing through a lens at different heights from the optical axis, e.g. the z axis. Light rays at greater distances from the optical axis refract at a higher angle at the first lens surface. Without the corrections of the spherical aberrations, the energy carried by the light wave will not be focused at a central location making it more difficult to collect the energy in the output fiber. An aspherical lens minimizes these aberrations by changing the shape of the lens from having surfaces that are defined by a fixed radius to having non-spherical surfaces (aspheric). Having one focal point for all rays passing through the lens results in a more efficient transfer of light energy from the in out fiber to the output fiber.

Coma: Light rays that are off axis and at an angle to the optical axis will focus at different points on the focal plane depending on the height and angle the ray makes relative to the optical axis. This spreading of the focal point results in a spreading of the light energy away from a central point resulting in a lower coupling efficiency. An aspherical minimizes coma by providing a large numerical aperture sufficient to accept optical beams that are not parallel with the optical axis. In an embodiment of the invention the aspherical lens exhibit numerical aperture in the range of 0.15–0.50.

Field curvature of a lens results from light rays that are off center and at an angle from the optical axis. This type of aberration is similar to that of coma but field curvature effects different groups of parallel light rays differently regardless of the diameter of the group of light rays. The behavior of field distortion causes the flat focal plane of paraxial theory to become curved.

For an axially symmetric lens the field curvature of the focal plane is symmetric about the optical axis making it a three-dimensional "cup shape" such as that shown for focal planes 140–142. Placement of the fiber tips would ideally be placed at locations on the curved plane symmetrically around the optical axis. In this configuration the fiber tips all share the same focal distance from the lens and the beams from the collimator would be collimated. For ease of manufacture however, the fiber interfaces result from the cleaving of the fibers in bundles in a single capillary tube for ease of handling during polishing and assembly. The ideal polish angle for the fiber bundle is 8 degrees. Polishing a bundle of fibers that are placed symmetrically around is the optical axis would result in the fiber tips existing on a slanted plane, i.e. planes 144–146 leaving opposing fibers off of the focal plane. The beams emerging from the lens would then be either slightly focused or slightly diverging. The geometry shown in FIG. 1 corrects for these differences by providing offsetting diverging and converging locations for the single and paired members of each triplet with respect to the focal planes of their corresponding lenses. In this configuration it is possible to efficiently couple light from one input fiber to the respective output fiber although neither one of the fiber tips are on the curved focal planes.

The final component in the apparatus is the optical processing unit 110. This unit provides the actual bending or splitting of the incident optical beams. Its alignment promotes optimal coupling to the extent that it too exhibits certain symmetries with the other components of the system. The OPU is in a preferred embodiment of the invention located proximate the substantially coincident focal points of the lenses 106–108. Additionally, where the OPU utilizes a birefringent crystal to optically process the light, the principal plane 124 of that crystal lies in the x-z plane. This assures that any splitting/walkoff of an incident optical beam into "e" and "o" rays will be in a plane which intersects the corresponding paired members of each triplet. For a an optical beam along the z axis the splitting/walkoff will be in the x-z plane. Alternately, where the OPU utilizes either a diffracting or partially reflecting interface to process an optical beam, the plane of the diffracting or reflecting interface 126 will preferably lie normal to the y axis. This assures that the diffracted, transmission, or reflection of incident beam will occur in a plane which intersects the corresponding paired members of each triplet. For a an optical beam along the z axis the diffraction, transmission or reflection will be in the x-z plane.

Figure 1B:
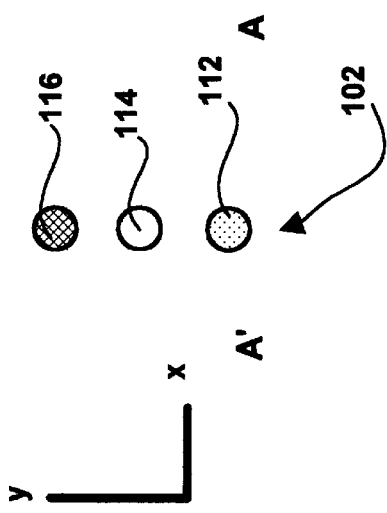
FIGS. 1B,D are end views at sections A—A' and B—B' of the configuration of optical fibers bundles shown in FIG. 1A.

FIGS. 1B,D are end views at sections A—A' and B—B' of the configuration of optical fibers bundles shown in FIG. 1A. For each triplet the single member is shown with the same hatch pattern as the paired members to which it is coupled. Thus single member 116 and paired members 122 form the first triplet. Single member 114 and paired members 120 form the second triplet. Single member 112 and paired members 118 form the third triplet.

Figure 1D:
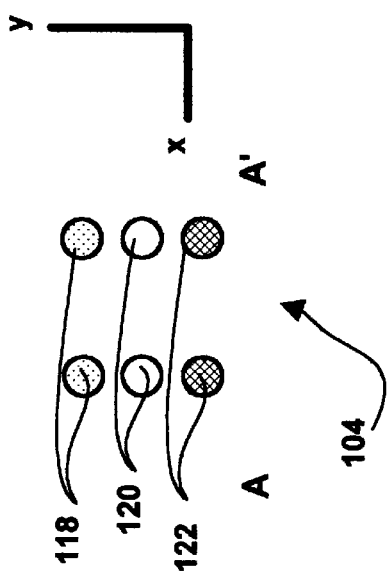
FIGS. 1C–D show an end view of the optical fiber bundles of an alternate embodiment of the invention.
Figure 1C:
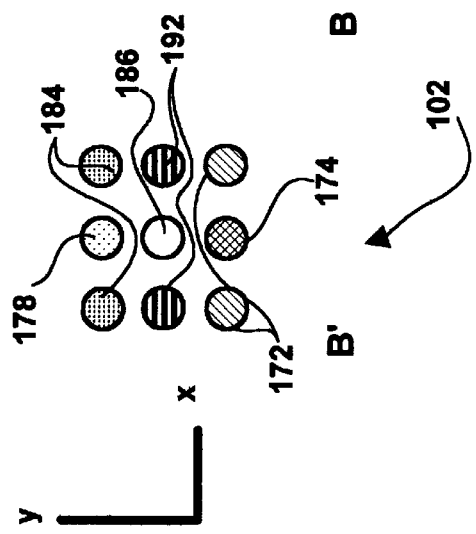
Figure 1E:
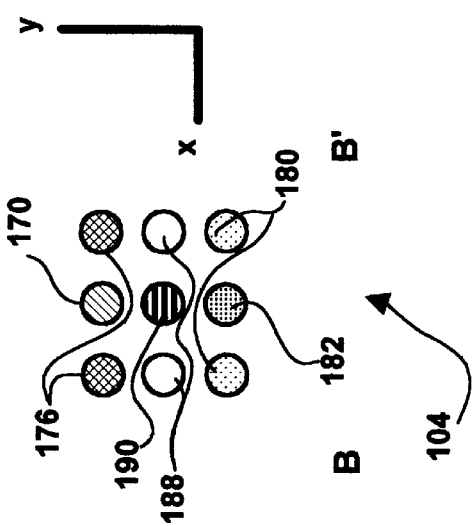

FIGS. 1C–E show an end view of the optical fiber bundles of an alternate embodiment of the invention. In this embodiment there are a total of 6 triplets, with the paired members of triplets on both the bundles 102 and 104. Single member 170 and paired members 172 form the first triplet. Single member 174 and paired members 176 form the second triplet. Single member 178 and paired members 180 form the third triplet. Single member 182 and paired members 184 form the third triplet. Single member 186 and paired members 188 form the fifth triplet. Single member 190 and paired members 192 form the sixth triplet. This embodiment has the advantage of providing symmetric first and second bundles which can be produced by the cleaving of a single set of fibers into two bundles.

Figure 2A:
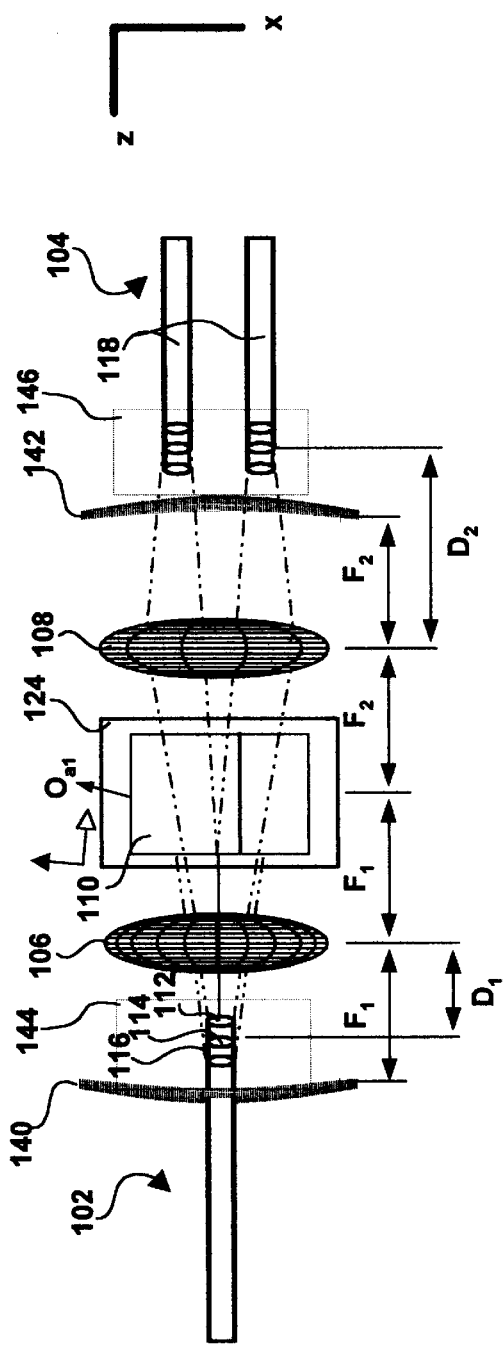
FIGS. 2A–B are top and side views respectively of the optical apparatus shown in FIG. 1A with a principal plane within the optical processing unit.
Figure 2B:
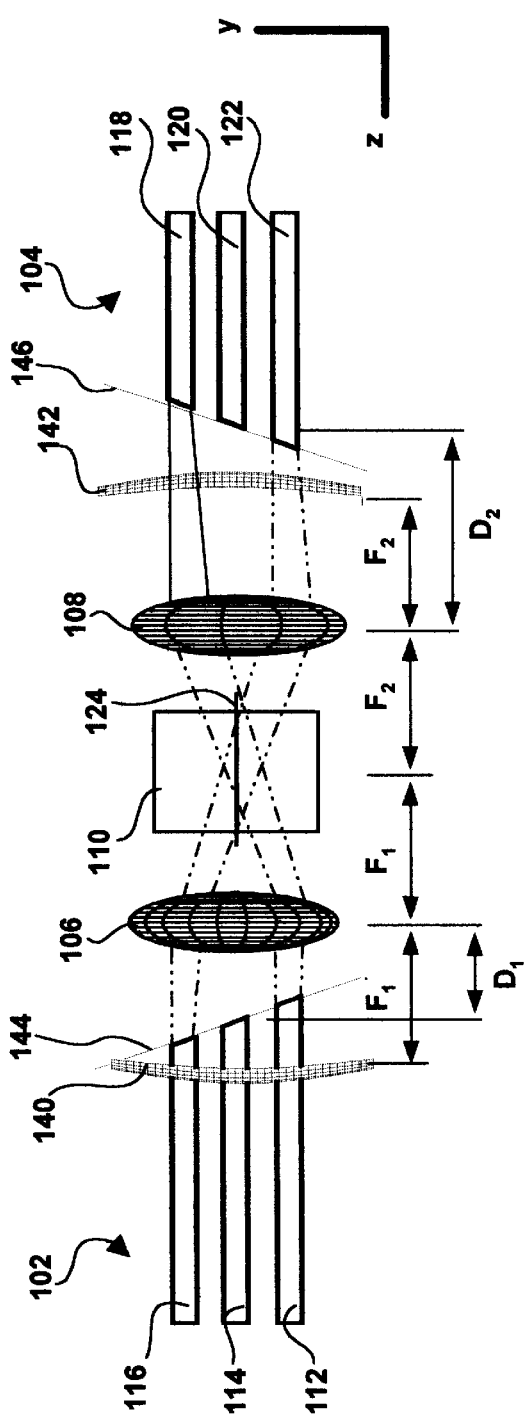

FIGS. 2A–B are top and side views respectively of the optical apparatus shown in FIG. 1A with a principal plane 124 within the optical processing unit. The optical axis may either be aligned with the longitudinal a.k.a. "z" axis or at an angle to it depending on the optical effect to be achieved. Lenses 106–108 are shown directing light toward the optical processing unit 110. In the example shown the OPU is processing light in a manner appropriate for an interleaver or a beam splitter/combiner for example. In either embodiment additional optical elements (not shown) well known to those skilled in the art, such as faraday rotators and polarizing filters, would be required to implement either process.

Figure 2C:
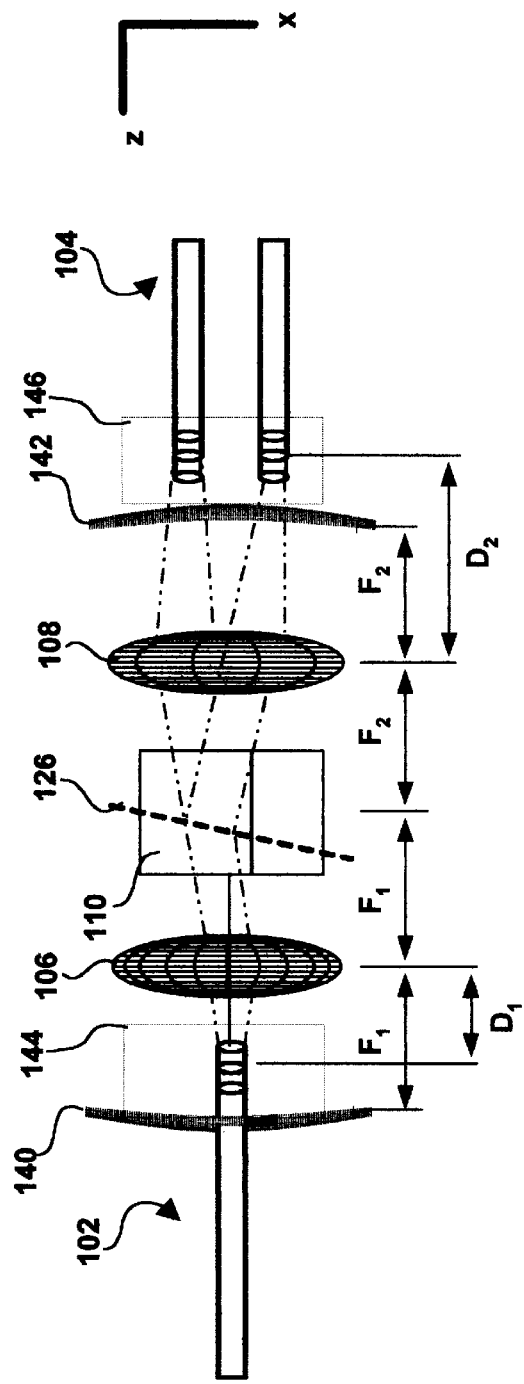
FIG. 2C is a top view of the optical apparatus shown in FIG. 1A with a partially reflective interface within the optical processing unit.

FIG. 2C is a top view of the optical apparatus shown in FIG. 1A with a partially reflective interface within the optical processing unit. That partially reflective/diffraction interface 126 is suitable for a demultiplexer or power tap for example.

FIGS. 3A–E are top views of alternate embodiments of the optical processing unit utilized for circulating, demultiplexing, tapping, combining/splitting and interleaving optical beams in parallel within an optical processing unit. The optical processing is shown for one of the triplets composed of the single member 116 and the paired members 122 (See FIG. 1A). The processing for the other triplets would be handled in parallel.

Figure 3A:
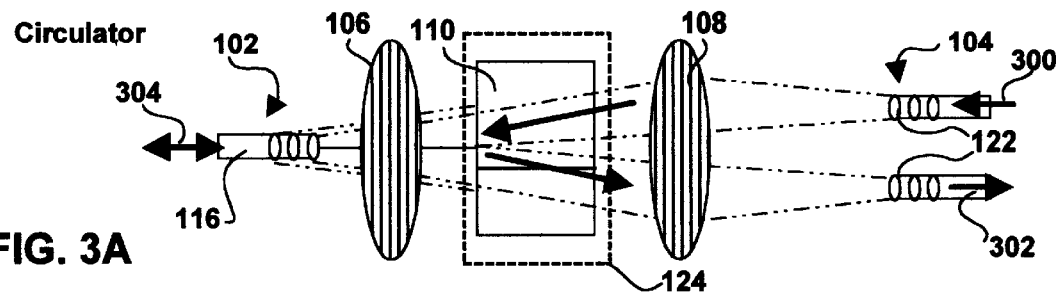
FIGS. 3A–E are top views of alternate embodiments of the optical processing unit utilized for circulating, demultiplexing, tapping, combining/splitting and interleaving optical beams in parallel within an optical processing unit.

FIG. 3A shows the OPU subjecting one of the selected triplets to a circulation process. In a circulator an optical beam passes to different ports depending on its propagation direction. Typically a birefringent crystal with a principal plane 124 is used to impart a distinctive polarization, a faraday rotator to provide non-reciprocal polarization rotation (i.e. isolation), and a polarization dependent beam deflector to direct the beams in a manner dependent on their polarization direction. In operation an optical beam 304 propagating from optical fiber 116 toward the OPU would exit as beam 302 on one of the corresponding paired members 122 while the counter propagating beam 300 would pass through the other of the corresponding paired members 122.

Figure 3B:
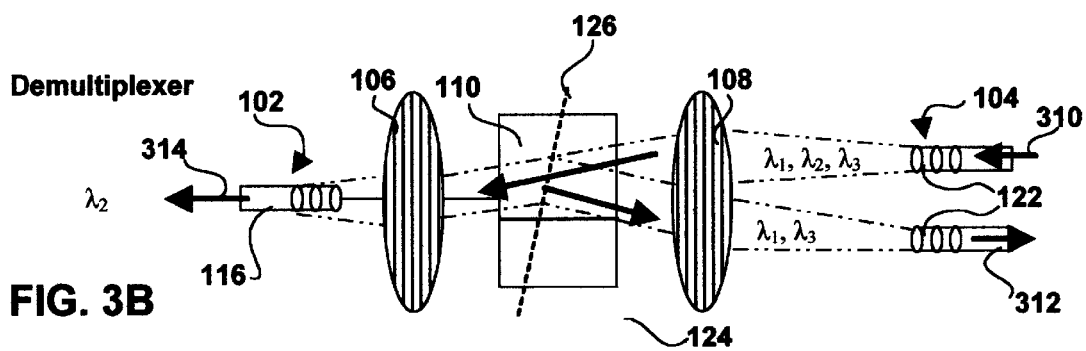

FIG. 3B shows the OPU subjecting one of the selected triplets to a demultiplexing process. In a demultiplexer optical beams with multiplexed channels are separated into two beams each with unique ones of the multiplexed channels. Typically a diffractive interface 126 such as a thin film filter may be utilized. An optical beam 310 with a plurality of wavelengths $\lambda_1\lambda_2\lambda_3$ entering one of the paired members 122 exits the triplets as two separate beams each with selected ones of the initial wavelengths. Beam 312 exits the other of the paired members with wavelengths $\lambda_1\lambda_3$. Beam 314 exits the triplet at the single port 116 with wavelength $\lambda_2$.

Figure 3C:
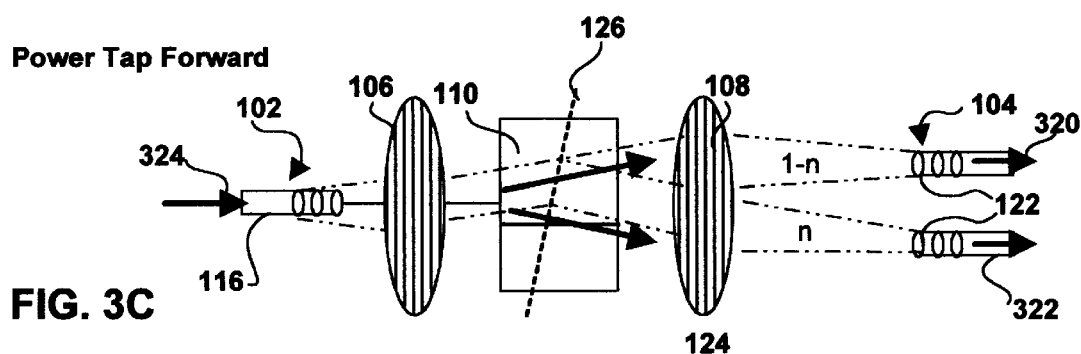

FIG. 3C shows a forward power tap. In a power tap a single optical beam at a first energy level is split into two beams each with energy levels the sum of which is substantially equal to that of the initial beam. In an alternate embodiment of the invention the OPU is configured to provide a reverse power tap. A reverse power tap may utilize a wavelength independent partially reflective surface 126 to transmit one portion and reflect another portion of an incident optical beam. In a forward power tap a diffracting interface is used to split an incident beam into two transmitted beams. An optical beam 324 with a first energy level is shown being split by the OPU into two separate beams 320–322 exiting the paired members 122 with respective energy levels 1–n and n.

Figure 3D:
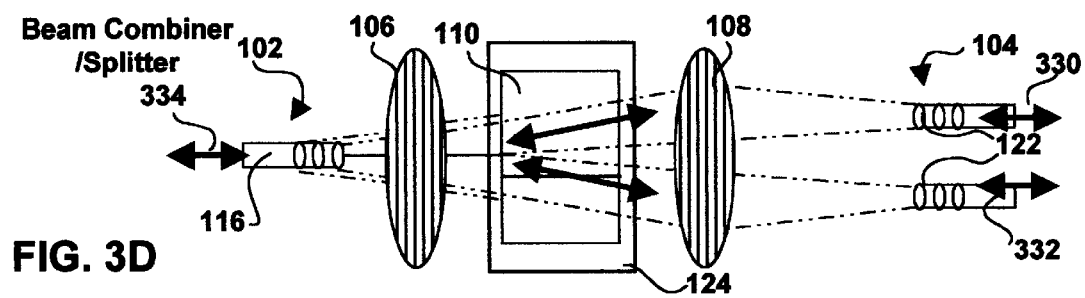

FIG. 3D shows a beam splitter or combiner which utilized a birefringent crystal with a principal plane 124 to split an arbitrarily polarized beam 334 into component beams 330–332 with orthogonal polarizations at either of the paired members 122.

Figure 3E:
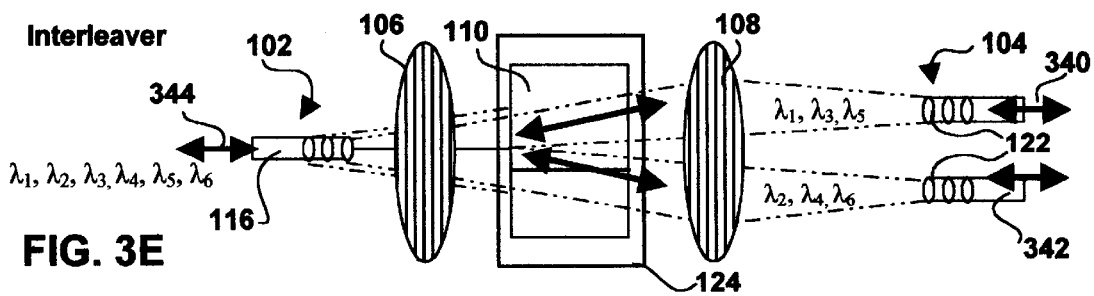

FIG. 3E shows the OPU that splits/combines odd and even wavelength channels in a principal plane 124 performing as an interleaver. As an interleaver an incoming beam 340 with even wavelengths $\lambda_1\lambda_3\lambda_5$ and an incoming beam 342 with even wavelengths $\lambda_2\lambda_4\lambda_6$ are combined into a single beam 344 with wavelengths $\lambda_1\lambda_2\lambda_3\lambda_4\lambda_5\lambda_6$. Since an interleaver is a reciprocal device, it can also be operated in reversed mode to split odd and even wavelengths.

In another embodiment of the invention selected fibers of one of the triplets are combined with those of another to achieve reprocessing of an optical beam. For a demultiplexer, for example, the output beam 314 can be reintroduced into the inputs of a second and third triplet to further filter out the residual light of other wavelengths thereby increasing channel isolation.

For a power tap it may be advantageous to pass the outputs of a first triplet to a second and third triplet to generate other taps on the original input beam.

Similar reprocessing may be achieved for the listed and other OPU processes with equal advantage.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An optical apparatus for parallel optical processing of optical beams on optical fibers with each of the optical fibers including a corresponding interface, and the optical apparatus comprising:

a first bundle and a second bundle of the optical fibers aligned substantially parallel with a longitudinally extending axis, with triplets of the optical fibers each including a single member on one of said first bundle and said second bundle, with each pair of members aligned in a different row from each other pair of members and a pair of members aligned in a row on the other of said first bundle and said second bundle and with the rows formed by the paired members of the triplets substantially parallel to one another;

lenses to direct the optical beams from either of said first bundle and said second bundle of the optical fibers toward substantially coincident focal points;

an optical processing unit (OPU) to process the optical beams directed by said lenses.

2. The optical apparatus of claim 1, with at least a first selected one of the rows on one of said first bundle and said second bundle and at least a second selected one of the rows on an other of said first bundle and said second bundle.

3. The optical apparatus of claim 2, wherein said lenses exhibit front and back focal planes with substantially complementary offsets from the first termination and the second termination.

4. The optical apparatus of claim 1, wherein the corresponding interfaces of each of the optical fibers of said first bundle and said second bundle define a substantially planar first termination of said first bundle and a substantially planar second termination of said second bundle, with the first termination and the second termination at complementary obtuse angles to one another about a first axis substantially parallel to the optical fibers.

5. The optical apparatus of claim 4, wherein projections of the first termination and the second termination intersect one another at a line substantially normal to the rows.

6. The optical apparatus of claim 1, wherein said lenses further comprise:

aspherical lenses.

7. The optical apparatus of claim 1, wherein said lenses exhibit a numerical aperture greater than 0.20.

8. The optical apparatus of claim 1, wherein said OPU further comprises:

a birefringent material located between said lenses with a principal plane oriented substantially parallel both to the rows defined by each triplet, and to a line extending between said first bundle and said second bundle.

9. The optical apparatus of claim 1, wherein said optical processing unit further comprises:

a partially reflective substantially planar interface oriented to intersect a first axis normal to each of said rows, with a line of intersection between the partially reflective substantially planar interface and the first axis substantially normal to each of said rows and to a line extending between said first bundle and said second bundle.

10. The optical apparatus of claim 1, wherein said optical processing unit further comprises at least one of: a circulator, a demultiplexer, an interleaver, a multiplexer, a forward power tap, a reverse power tap, a power splitter, a polarization beam combiner and a polarization beam splitter.

11. The optical apparatus of claim 1, with said optical processing unit further comprising:

a birefringent material located between said lenses to circulate optical beams in each triplet of optical fibers.

12. The optical apparatus of claim 1, with said optical processing unit further configured with a wavelength selective transmissive/reflective interface to demultiplex optical beams from a selected optical fiber of each triplet of optical fibers at a corresponding remaining pair of the optical fibers of each of the triplets.

13. The optical apparatus of claim 1, with said optical processing unit further configured with a diffraction interface to tap power from optical beams from a selected optical fiber of each triplet of optical fibers at a corresponding remaining pair of the optical fibers of each of the triplets.

14. The optical apparatus of claim 1, with said optical processing unit further configured with a substantially wavelength insensitive reflective interface to tap power from optical beams from a selected optical fiber of each triplet of optical fibers at a corresponding remaining pair of the optical fibers of each of the triplets.

15. The optical apparatus of claim 1, with said optical processing unit further configured with a principal plane to split arbitrarily polarized optical beams from a selected optical fiber of each triplet of optical fibers into orthogonally polarized light at a corresponding remaining pair of the optical fibers of each of the triplets.

16. The optical apparatus of claim 1, with said optical processing unit further configured with a principal plane parallel to combine orthogonally polarized optical beams from a selected pair of the optical fibers of each triplet of optical fibers into arbitrarily polarized light at a corresponding remaining one of the optical fibers of each of the triplets.

17. The optical apparatus of claim 1, with said optical processing unit further configured with a principal plane to interleave optical beams from a selected optical fiber of each triplet of optical fibers at a corresponding remaining pair of the optical fibers of each of the triplets.

18. The optical apparatus of claim 1, further comprising:

optical couplings between selected optical fibers of at least a first triplet and a second triplet of optical fibers to reintroduce for reprocessing within the OPU at least a portion of an optical beam.

19. A method for parallel optical processing of optical beams propagating on optical paths and with each optical path including a corresponding interface, and said method comprising the acts of:

aligning the optical paths substantially parallel with a first axis, with triplets of the optical paths each including a pair of optical paths defining a row and a single optical path, with each pair of optical paths aligned in a different row from each other pair of optical paths, and the interfaces of the triplets defining an opposing pair of substantially planar first and second terminations of the optical paths, with the rows formed by the paired members of the triplets substantially parallel to one another;

directing the optical beams from either of the opposing pair of substantially planar first and second terminations toward substantially coincident focal points between the pair of terminations;

optically processing the optical beams directed in said act of directing.

20. The method of claim 19, wherein said aligning act further comprises:

aligning the corresponding interfaces of each of the opposing pair of terminations at substantially complementary obtuse angles to one another about the first axis.

21. The method of claim 19, wherein said aligning act further comprises:

aligning the rows of the triplets substantially parallel to one another.

22. The method of claim 19, wherein said aligning act further comprises:

aligning the first termination and the second termination wherein a plane of the first and a plane of the second terminations intersect one another at a line substantially parallel to the rows.

23. The method of claim 19, wherein said directing act further comprises:

converting a diverging optical beam directed toward the substantially coincident focal points from one of the opposing pair of terminations to a converging optical beam directed toward the opposing pair of terminations; and converting a converging optical beam directed toward the substantially coincident focal points from one of the opposing pair of terminations to a diverging optical beam directed toward the opposing pair of terminations.

24. The method of claim 19, wherein said optical processing act further comprises:

circulating optical beams between selected ones of the corresponding optical paths of each triplet.

25. The method of claim 19, wherein said optical processing act further comprises:

demultiplexing, in each of the triplets, a corresponding one of the optical beams from one of the corresponding three optical paths at a remaining two of the optical paths of the corresponding triplet.

26. The method of claim 19, wherein said optical processing act further comprises:

tapping, in each of the triplets, an energy of a corresponding one of the optical beams from one of the corresponding three optical paths at a remaining two of the optical paths of the corresponding triplet.

27. The method of claim 19, wherein said optical processing act further comprises:

splitting, in each of the triplets, a corresponding one of the optical beams with an arbitrary polarization state from one of the corresponding three optical paths into orthogonally polarized rays at a remaining two of the optical paths of the corresponding triplet.

28. The method of claim 19, wherein said optical processing act further comprises:

combining, in each of the triplets, a corresponding pair of the optical beams with orthogonal polarization states from two of the corresponding three optical paths into arbitrarily polarized rays at a remaining one of the optical paths of the corresponding triplet.

29. The method of claim 19, wherein said optical processing act further comprises:

interleaving, in each of the triplets, a corresponding one of the optical beams with a plurality of wavelengths from one of the corresponding three optical paths into a pair of rays with odd and even wavelengths respectively at a remaining two of the optical paths of the corresponding triplet.

30. The method of claim 19, wherein said optical processing act further comprises:

interleaving, in each of the triplets, a corresponding pair of the optical beams with odd and even wavelengths respectively from two of the corresponding three optical paths into a ray with both odd and even wavelengths at a remaining one of the optical paths of the corresponding triplet.

31. The method of claim 19, further comprising the act of:

optically coupling at least one selected optical path of one of the triplets with at least one selected optical path of another of the triplets to optically reprocess at least a portion of an optical beam.

* * * * *